Sept. 17, 1929. W. A. CLENCH 1,728,262
RIM LOCK
Original Filed Jan. 5, 1921 2 Sheets-Sheet 1
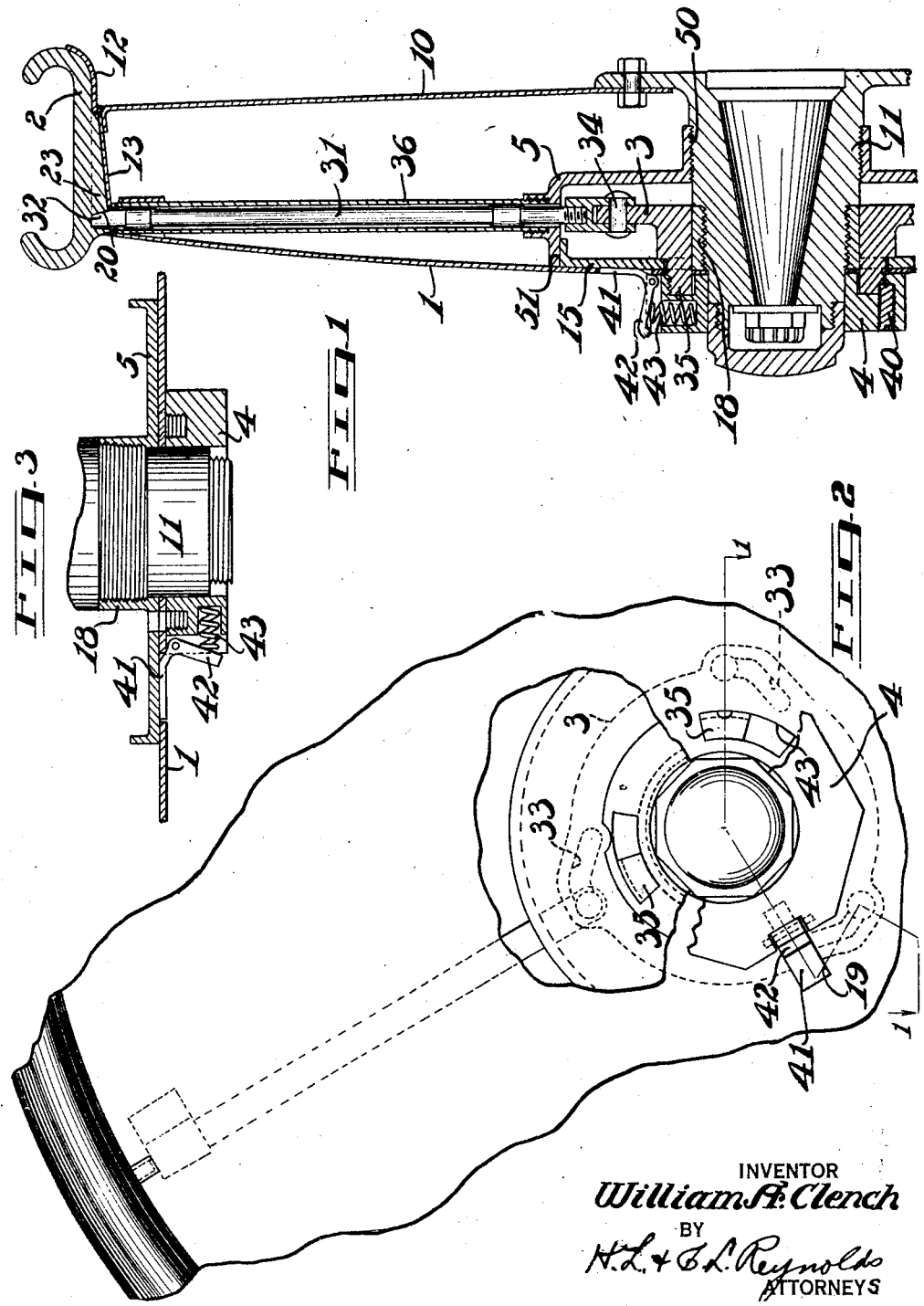
INVENTOR
William A. Clench
BY
H.L. & C.L. Reynolds
ATTORNEYS

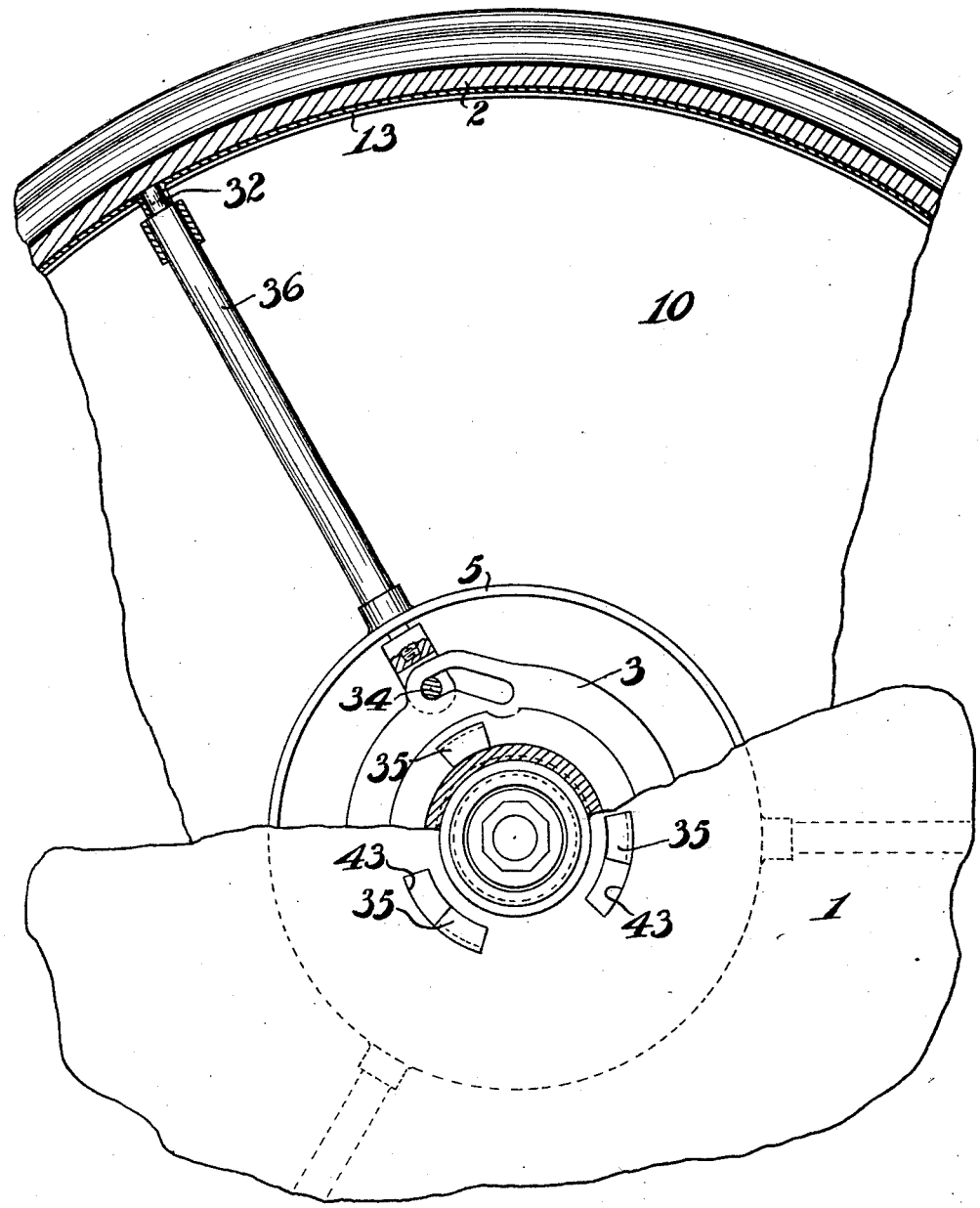

Patented Sept. 17, 1929

1,728,262

UNITED STATES PATENT OFFICE

WILLIAM A. CLENCH, OF ALAMEDA, CALIFORNIA, ASSIGNOR TO STANDARD DISK WHEEL COMPANY, OF SEATTLE, WASHINGTON, A CORPORATION OF WASHINGTON

RIM LOCK

Application filed January 5, 1921, Serial No. 435,160. Renewed August 4, 1924.

My invention relates particularly to rim locking devices for use with disk wheels. It may be used either with a single or with a double disk wheel, but for purposes of illustration I have shown it in connection only with a double disk wheel. Nor is its use confined solely to disk wheels, for it may be used with or incorporated in any wheel having those characteristics of the wheel, pointed out hereinafter, which peculiarly adapt such wheel to use with my invention.

The principal object of my invention is to provide a locking means for a disk wheel which will be behind the front disk and which, if used with a double disk wheel, will be enclosed between the disks, which may be operated from without the disk by means secured upon the hub, to the end that the good appearance of the wheel is unaltered.

Another object is to provide such locking means as described above which may be cheaply made and conveniently assembled within a wheel.

Another object is to provide such locking means which may be so assembled as to provide practically a watertight and dust-proof locking means and operating means therefor.

A further object is the provision of means whereby a demountable rim may be forced and held in position upon the wheel.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is an axial section through a portion of a wheel and hub, illustrating my locking means and control therefor.

Figure 2 is an elevation of a portion of a wheel showing my locking means in connection therewith, parts being broken away.

Figure 3 is a section of a portion of the hub of a wheel and the control means.

Figure 4 is another elevation of a portion of the wheel and locking means, parts being broken away.

My invention relates particularly to devices of that type shown in my Patent No. 1,440,210, Dec. 26, 1922, but differs therefrom particularly in the means for operating the rim locking device. It has been found inconvenient with devices of the type shown in that application to secure sufficient leverage to drive home the locking bolts, without destroying the strength or the good appearance of the wheel by the provision of a large hand hold. It is the object particularly of my present invention to provide means whereby a wrench may be applied at the hub of the wheel to drive home the locking bolts which I employ and to insure their positive locking and holding, and their unlocking only when this is desired.

The wheel itself may be formed of the outer disk 1, the inner disk 10, which are both secured upon the hub 11 and which are connected at their circumferences by a felly 12. Depressions 13 are provided in the felly for the reception of keys 23 forming parts of a demountable rim 2, which is adapted to be secured upon the wheel.

Locking bolts 31 are reciprocable behind the front disk 1 or, in the present instance, between the disks 1 and 10, and each bolt has its outer end 32 tapered to fit within a tapering socket 20 of the key 23. This socket 20 is preferably located adjacent the outer disk 1. Forcing the tapered end 32 into the socket 20 forces the rim 2 back securely into place upon the felly 12. A ring 3 is mounted upon the hub to oscillate and is provided with cam means, as the slot 33, within which are received pins 34 carried by the inner ends of the locking bolts 31, whereby the bolts 31 may be projected to lock the rim in place or retracted to permit its removal.

The object in forcing the rim 2 back upon the felly 12, through the use of the tapered ends 32 of the locking bolts, is not so much to expand the rim through the instrumentality of the inclined key 23 in its similarly inclined depression 13, as it is to make the rim tight so that it will not rattle, and to properly support the rim from the felly so that the weight is transmitted from the wheel felly to the rim direct, rather than through the keys 23.

Projecting outwardly from the ring 3 are lugs 35 which are preferably formed integral with the ring. Slots 43 are formed in the outer disk 1, if this extends inward to the hub or in the supporting flange 15 just within the disk 1, or in both, through which the lugs 35 may project. The slots 43 are concentrically arranged and of segmental shape to permit oscillation of the lugs 35 with the ring 3. A head 4, which may be so formed as to receive a wrench, is secured upon the lugs 35 in some suitable manner, as by threading it upon the outer circumferences of the lugs. The head 4 must be secured upon the lugs so that it will not be movable relative thereto after it is secured in place. This may be simply done by means of set screws 40 engaging both the head 4 and the lug or lugs 35. The head 4, it should be understood, is rotatable relative to the hub 11. By applying a wrench to the head 4 and turning it, the ring 3 may be turned to cause reciprocation of the locking bolts 31.

I provide means for locking the head 4 in position corresponding to projected position of the bolts 31. This may be any means which are found suitable, such as the bell-crank lever having one end 41 engageable within a recess 19 in the disk 1, and having its other end 42 held in position slightly above the circumferential surface of the head 4, by means of a small spring 43. The end 42 is depressed with the adjusting of a wrench in position upon the head 4.

I prefer to surround the operating parts within the wheel with a suitable casing 5 to prevent the entry of water, dust, or sand thereto. The casing 5 may be threaded upon the hub 11 at 50 and it should be joined at 51 to the supporting flange 15 tightly enough to prevent the entrance of water and the like. This joint might be welded, if desired, but this would make repairs difficult, in case of an accident. In assembling the wheel, graphite may be used at 51 to insure a tight joint. The flange 15 I form with an inwardly projecting sleeve 18 which is threaded upon the hub, and it is upon this sleeve 18 rather than upon the hub itself that the ring 3 is mounted and is oscillable. To complete the encasing of the working parts a tube 36 encloses each locking bolt 31 and extends between the casing 5 and the felly 12 of the wheel.

In assembling the wheel the casing 5 may be threaded in place simultaneously with the ring 3 and the flange sleeve 18. The head 4 is then secured in place with the outer disk 1 between it and the flange 15. The disk 1 and flange 15 may then be electrically welded or otherwise joined. When formed in the manner described all working parts of my wheel are enclosed; the locking bolts may be forced into or out of place by a wrench upon the outside of the wheel, where sufficient leverage may be obtained; the wheel presents an attractive, unbroken appearance, and is strong and durable.

What I claim as my invention is:

1. In a disk wheel, the combination with a demountable rim and locking bolts behind the outer disk and projectable to lock the rim upon the wheel, of a ring oscillable upon the hub and having cam means engaging said locking bolts to reciprocate them, a head positioned at the hub and outside of the outer disk, and engageable by a wrench for turning, and connecting means extending between and secured to said head and said ring, said connecting means passing through and being oscillable relative to said outer disk.

2. In a disk wheel, the combination with a demountable rim and locking bolts behind the outer disk and projectable to lock the rim upon the wheel, of a ring oscillable upon the hub and having cam means engaging said locking bolts to reciprocate them, outwardly projecting lugs upon said ring, the disk being slotted to permit the projection and oscillation of said lugs, and a head fixed upon said lugs outwardly of the disk.

3. The combination with a device as in claim 1 of means for positively securing said bolts in projected position.

4. In a disk wheel, the combination with a demountable rim and locking bolts behind the outer disk and projectable to lock the rim upon the wheel, of a ring oscillable upon the hub and having cam means engaging said bolts to reciprocate them, outwardly projecting lugs upon said ring, the disk being slotted to permit the projection and oscillation of said lugs, a head adapted to receive a wrench and fixed upon said lugs outwardly of the disk, and securing means for said bolts engageable by a wrench positioned upon said head to be released.

5. In a disk wheel, the combination with a demountable rim and locking bolts behind the outer disk and projectable to lock the rim upon the wheel, of a ring oscillable upon the hub and having cam means engaging said bolts to reciprocate them, outwardly projecting lugs upon said ring, the disk being slotted to permit the projection and oscillation of said lugs, a head adapted to receive a wrench and fixed upon said lugs outwardly of the disk, and a spring-pressed bell-crank lever having one end engageable with the face of the disk to secure said bolts in locking position, and having its other end engageable by a wrench positioned upon said head to permit the release of said bolts.

6. In a disk wheel, the combination with a demountable rim and locking bolts behind the outer disk and projectable to lock the rim upon the wheel, of a ring oscillable upon the hub and having cam means engaging said bolts to reciprocate them, outwardly projecting, concentric, segmental lugs upon said ring, the disk being slotted to permit permanent projection and selective oscillation of said lugs, the outer circumferences of said lugs being threaded, a head adapted to receive a wrench and threaded upon said lugs outwardly of the disk, and means for securing said head against movement relative to said lugs.

7. In a disk wheel, a hub, an outer disk having concentrically arranged segmental slots adjacent its center, a supporting front flange having slots adapted to register with said slots in the disk, and secured upon the hub, radially reciprocable rim-locking bolts behind said outer disk, a ring oscillable upon the hub behind said flange, and having cam means engaging said bolts to reciprocate them, outwardly projecting lugs on said ring projectable through the slots in the flange and disk and oscillable therein, and a head secured upon said lugs outwardly of the outer disk.

8. In a disk wheel, a hub, an outer disk having concentrically arranged segmental slots adjacent its center, a supporting front flange inward of said disk, and having slots adapted to register with said slots in the disk, and having an inwardly-projecting sleeve threaded upon the hub, a ring oscillabel upon said flange sleeve and having cam means, radially-reciprocable rim-locking bolts engageable by said cam means to be reciprocated, lugs upon said ring projecting outwardly through said slots in the flange and disk, and oscillable therein, a head secured upon said lugs outwardly of the outer disk, and a casing threaded upon said hub and enclosing said ring, said casing and front flange being engageable to form a tight joint therebetween, and said casing being perforated for the projection of said locking bolts.

9. In a disk wheel, a hub, an outer disk having concentrically arranged segmental slots adjacent its center, a supporting front flange inward of said disk, and having slots adapted to register with said slots in the disk and having an inwardly-projecting sleeve threaded upon the hub, a ring oscillable upon said flange sleeve and having cam means, radially-reciprocable rim-locking bolts engageable by said cam means to be reciprocated, lugs upon said ring projecting outwardly through said slots in the flange and disk, and oscillable therein, a head secured upon said lugs outwardly of the outer disk, and a casing threaded upon said hub and enclosing said ring, said casing and front flange being engageable to form a tight joint therebetween, said casing being perforated for the projection of said locking bolts, and a continuous tube surrounding each of said locking bolts and extending between said casing and the wheel rim.

Signed at Seattle, King County, Washington, this 31st day of December, 1920.

WILLIAM A. CLENCH.